Oct. 31, 1967 J. F. NICHOLAS 3,350,657

FAIL SAFE DC DIFFERENTIAL AMPLIFIER

Filed Oct. 30, 1964 3 Sheets-Sheet 1

INVENTOR.
JOHN F. NICHOLAS
BY Harry A. Herbert Jr
and George Fine
ATTORNEYS

INVENTOR.
JOHN F. NICHOLAS
BY Harry A. Herbert Jr
and George Fine
ATTORNEYS

FAIL SAFE DC DIFFERENTIAL AMPLIFIER

Filed Oct. 30, 1964

INVENTOR.
JOHN F. NICHOLAS
BY Harry A. Herbert Jr.
and George Fine
ATTORNEYS

United States Patent Office 3,350,657
Patented Oct. 31, 1967

3,350,657

FAIL SAFE DC DIFFERENTIAL AMPLIFIER

John F. Nicholas, Liverpool, N.Y., assignor to the United States of America as represented by the Secretary of the Air Force Filed Oct. 30, 1964, Ser. No. 407,942
3 Claims. (Cl. 330—69)

This invention relates to an amplifier which shuts off in the event of tube failure, and more particularly, to a DC differential amplifier which produces a decreased output voltage with tube failure.

Amplifiers which produce a greatly increased voltage output in the event of tube failure are unacceptable in many electronic applications. This is especially true in feedback designs where a greatly increased output of a defective control tube could cause a controlled output to vary widely beyond acceptable tolerances, and thereby cause possible damage in a system. This invention describes a control circuit in which a defective tube would be prevented from causing wide fluctuation of the controlled parameter. The invention is a modification of a basic double triode D-C amplifier circuit by the addition of some resistors and silicon diodes. For normal operation, the modified amplifier functions in the same way as the unmodified amplifier. However, most tube failures which would produce an abnormal increase in D-C voltage output from the unmodified amplifier will actually produce a greatly decreased D-C output voltage from the modified amplifier. Since an increased output with tube failure is often unwanted and sometimes even disastrous, the modified circuit is desirable because it provides a "shut off" or "fail safe" action with tube failure.

It is accordingly one object of the present invention to provide a circuit with a "fail safe" action in the event of tube failure.

It is another object of the present invention to provide a reliable control circuit in which the output voltage decreases to a very low value in the event of tube failure.

Further objects will become apparent from the following description and claims, especially when considered in conjunction with the drawings.

Figure 1:
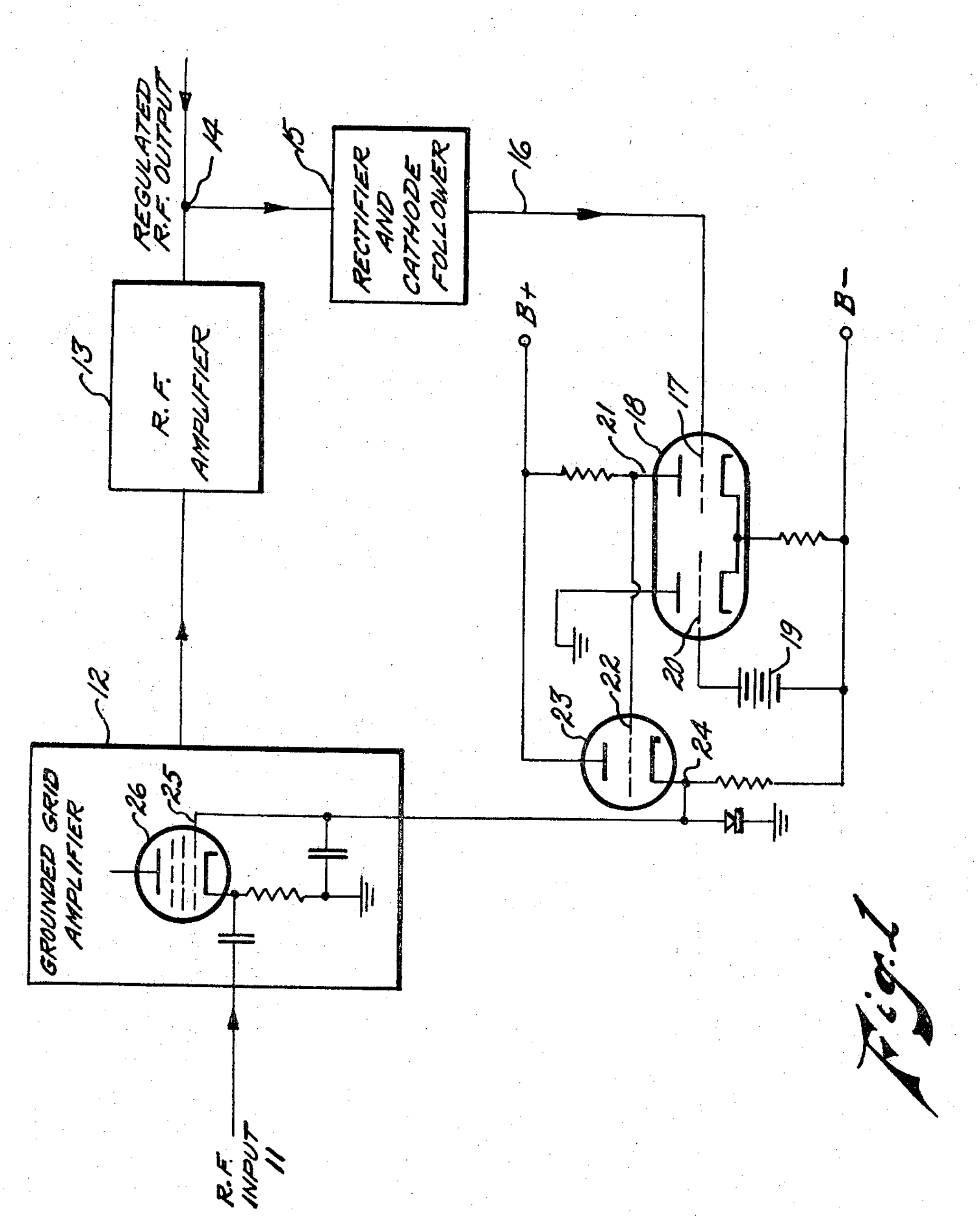
FIGURE 1 is a conventional circuit of a differential amplifier.

FIGURE 1 shows an automatic gain control circuit for the radio frequency amplifier in the stabilized local oscillator of a radar system, before the invention was added. In FIGURE 1, rectified output 16 of R-F amplifier 13 is fed to grid 17 of differential amplifier 18. The output of R-F amplifier 13 is thereby compared with reference voltage 19 which is fed to grid 20 of amplifier 18. A change in the rectifier voltage output 16 produces an amplified change in the opposite direction at plate pin 21 of tube 18. This amplified and inverted change is applied to grid 22 of tube 23, and is fed from cathode 24 of tube 23 to grid 25 of R-F tube 26 of grounded grid amplifier 12, the gain of which is therefore varied inversely to the change in output of R-F amplifier 13. The output of R-F amplifier is therefore regulated.

In FIGURE 1, if a failure in the right half of tube 18 interrupts the plate current, the plate voltage at pin 21 of tube 18 can increase, thus removing the negative bias on the control grid, pin 25, of tube 26. This causes the R-F amplifier output at terminal 14 to increase to a maximum. Such a situation was unacceptable in this application where any tube failure, including that of tube 18, was required to produce zero R-F output, permitting a standby R-F amplifier to assume all the load while the main R-F amplifier was being repaired. To include tube 18 in the "fail safe" category, the circuit of FIGURE 1 was modified to obtain the circuit of FIGURE 2.

Figure 2:
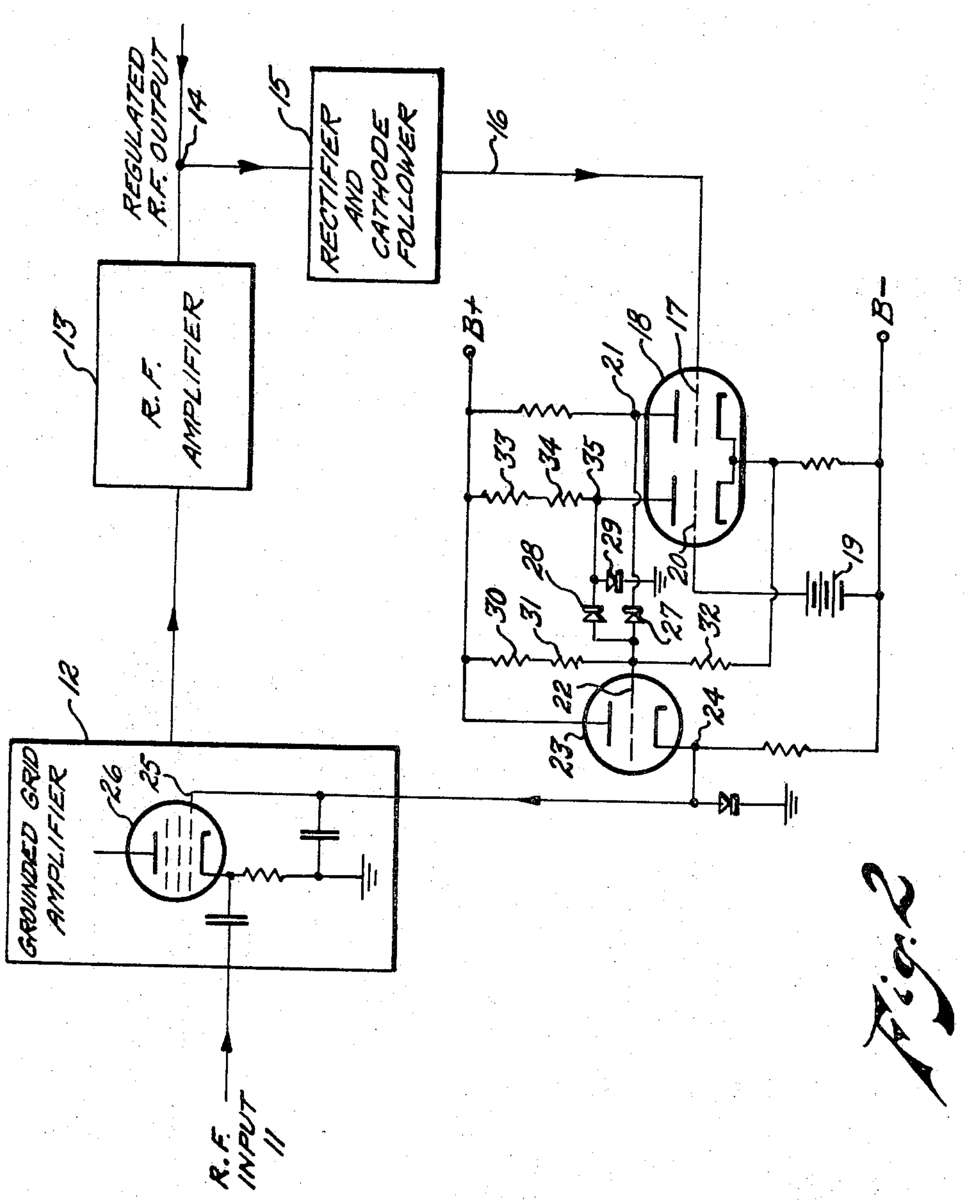
FIGURE 2 is the circuit of FIGURE 1 modified by the invention to provide the "fail safe" operation.

FIGURE 2 is the same as FIGURE 1 except for the addition of diodes 27, 28, and 29 and resistors 30, 31, 32, 33, and 34. When tube 18 is operating normally as an automatic gain control amplifier, diode 29 is conducting, essentially grounding plate terminal 35 of tube 18. Diode 27 is also conducting, essentially connecting plate terminal 21 of tube 18 to grid terminal 22 of tube 23. Diode 28 is non-conducting, thereby isolating plate terminal 35 of tube 18 from grid terminal 22 of tube 23. Therefore, under normal conditions, the circuit of FIGURE 2 operates essentially the same as that of FIGURE 1.

In FIGURE 2, if the right half of tube 18 fails, e.g. if the filament or plate opens, the rise in voltage of terminal 21 is blocked by diode 27, which is in a non-conducting state. Since the two halves of tube 21 are cathode coupled, the plate current in the left half of tube 18 greatly increases. Diode 29 switches to a non-conducting state, and the increased current in resistors 33 and 34 causes a drop in plate voltage at terminal 35 of tube 18. Diode 28 conducts, causing a drop in voltage of grid 22. Cathode 24 of tube 23 increases the negative bias on grid 25 of tube 26, shutting off the R-F amplifier.

If both filaments of tube 18 fail, and thereby shut off plate current in both halves of tube 18, diodes 27 and 28 switch to a non-conducting state, preventing the plate voltage rise at either terminals 35 or 21 of tube 18 from reaching grid 22. The voltage across the cathode resistor of tube 18 will decrease, and a portion of this decrease will be coupled to grid 22 by the resistor divider made up of resistors 30, 31, and 32. Therefore cathode 24 of tube 23 again increases the negative bias on tube 26, again shutting off the R-F amplifier.

If the left half of tube 18 develops an open filament or plate, the right half of tube 18 will conduct heavily, dropping the bias voltage on grid 22 and causing the R-F amplifier to be shut off. For this particular failure, the circuit of FIGURE 1 would produce the same result.

If a grid-to-cathode or a grid-to-plate short circuit develops in either half of tube 18, the resulting drop in plate voltage at that half of tube 18 will again cause the R-F amplifier to be shut off.

Figure 3:
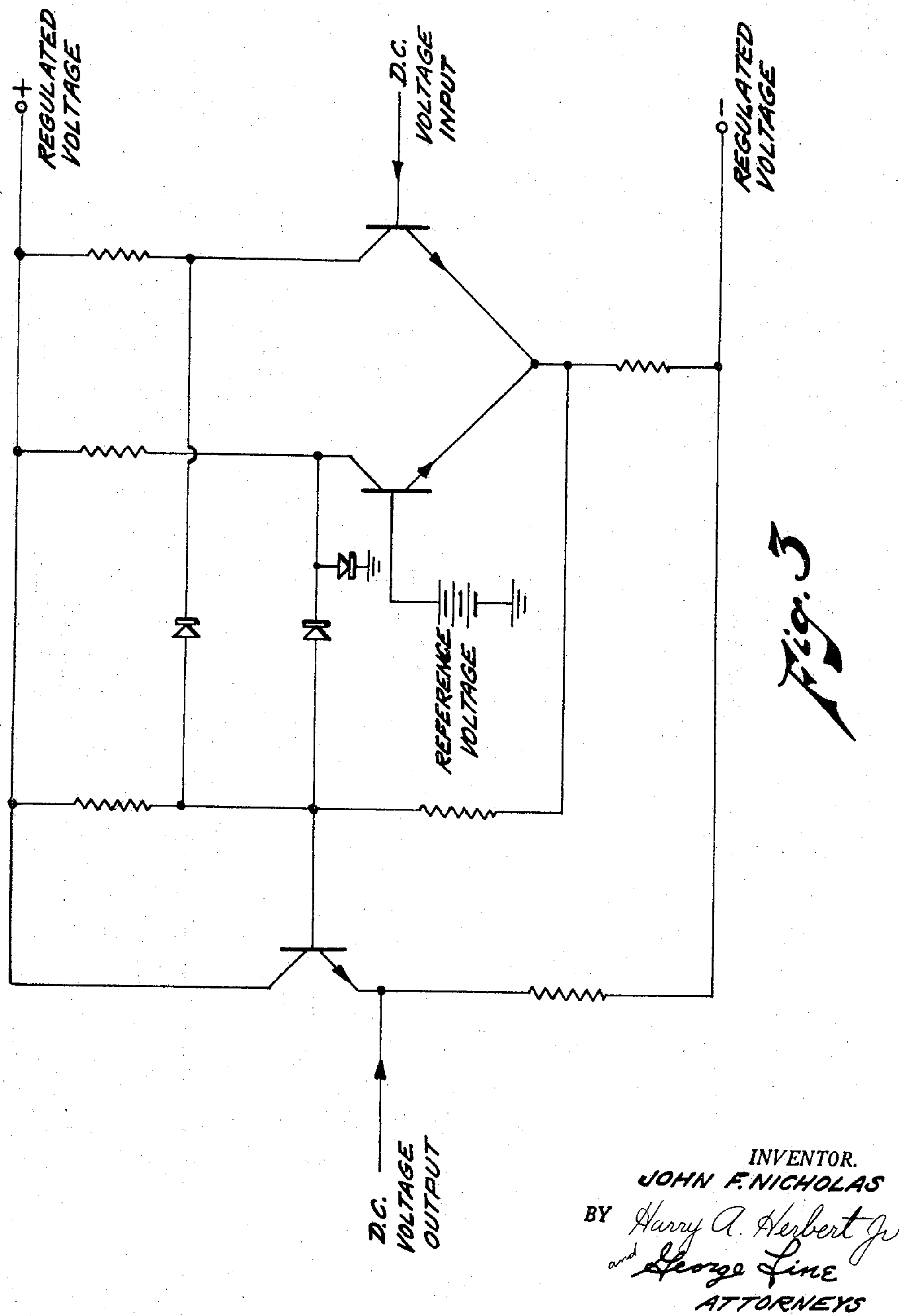
FIGURE 3 is a transistorized version of the "fail safe" circuit.

A transistor amplifier with the "fail safe" feature is shown in FIGURE 3.

The purpose of this invention was to control the results of most of the probable circuit failures. The added components increase the number of possible total failures but the controlled result of the average failure increases the reliability of the main R-F power amplifier when it is used with a standby R-F power amplifier.

An open circuit in one of the added resistors of FIGURE 2 would probably either permit continued normal operation or produce immediate "fail safe" action. "Fail safe" action for the next tube failure of tube 18 would, however, be impaired.

A failure of the blocking action of diode 28 or the forward conduction of diode 27 would probably result in the loss of both normal and "fail safe" operation of tube 18. However, since all diodes used in the invention are silicon rectifiers operated at a small percentage of their rated inverse voltage and a very small percentage of their rated forward current, their failure rate would be extremely low.

Some disadvantages of this circuit are that a failure in the cathode resistor of tube 18 would not provide "fail safe" action. Also, if both plate connections were opened, the current from both grids would cause enough voltage drop across the cathode resistor to prevent the divider resistors 30, 31 and 32 from pulling down grid 22 sufficiently negative to cut off the R-F amplifier. The circuit was designed around regulated voltage supplies which could in some cases be misadjusted far enough to void the "fail saft" action. No difficulty from supply voltage changes was encountered in the laboratory.

It is to be understood that the above-described arrangements are illustrative of the application of the principles of the invention. Numerous other arrangements may be devised by those skilled in the art without departing from the spirit and scope of the invention.

What is claimed is:

1. In a D-C differential amplifier circuit, the combination of a first and a second amplifier tube, each tube including a cathode, an anode, and a control grid, with a signal input terminal connected to the control grid of said first amplifier tube, and an output circuit connected to the anodes of said amplifier tubes; a source of positive high voltage supply, a pair of resistors connected to said high voltage supply, with the remote end of each resistor connected to the anodes of each tube; a source of low voltage negative bias supply, a cathode resistor connected thereto, the remote end of said resistor connected to each cathode; a source of reference voltage connected to the control grid of said second amplifier tube, biasing said tube in the forward direction; and output circuit comprising a first resistor and a second resistor connected in series at an output terminal with the remote end of said first resistor connected to the positive high voltage supply, and the remote end of said second resistor connected to the cathodes of said tubes, a first diode and a second diode connected to the anodes of said first tube and second tube respectively from said output terminal, said second diode being poled in the forward direction, a third diode connected from the anode of said second tube to ground and poled in the forward direction.

2. In a D-C differential amplifier circuit having a first and a second amplifier tube each including an anode, a cathode, and a control grid, said second tube control grid biased in the forward direction, an output circuit for preventing an excessive voltage output at an output terminal in the event of tube failure, comprising a source of positive high voltage supply, a first resistor and a second resistor connected in series at said output terminal with the remote end of said first resistor connected to the positive high voltage source, and the remote end of said second resistor connected to the cathodes of said tubes, a first diode and a second diode connected from said output terminal to the anodes of said first tube and second tube respectively, said second diode being poled in the forward direction, and a third diode connected from the anode of said second tube to ground and poled in the forward direction.

3. In a D-C differential amplifier circuit, the combination of a first and a second transistor, each transistor including an emitter, a collector, and a base, with a signal input terminal connected to the base of said first transistor and an output circuit connected to the collectors of said transistors; a source of positive collector supply voltage, a pair of resistors connected to said supply voltage with the remote end of each resistor connected to the collectors of each transistor; a source of negative bias voltage, an emitter resistor connected thereto, the remote end of said resistor connected to each emitter; a source of reference voltage connected to the base of said second transistor, biasing said transistor in the positive direction; an output circuit comprising a first resistor and a second resistor connected in series at an output terminal with the remote end of said first resistor connected to the positive collector supply voltage, and the remote end of said second resistor connected to the emitters of said transistors, a first diode and a second diode connected to the collectors of said first transistor and second transistor respectively from said output terminal, said second diode being poled in the forward direction, and a third diode connected from the collector of said second transistor to ground and poled in the forward direction.

References Cited

UNITED STATES PATENTS

| | | | |
|---|---|---|---|
| 3,026,455 | 3/1962 | Smith | 330—69 X |
| 3,050,692 | 8/1962 | Willard. | |

ROY LAKE, *Primary Examiner.*

NATHAN KAUFMAN, *Examiner.*